United States Patent

Nützel et al.

[11] 4,349,423
[45] Sep. 14, 1982

[54] PROCESS FOR DECOMPOSING HARD METAL SCRAP

[75] Inventors: Hans G. Nützel, Bilthoven; Rudolf Kühl, Vianen, both of Netherlands

[73] Assignee: SKF Industrial Trading & Development Co. B.V., Nieuwegein, Netherlands

[21] Appl. No.: 38,936

[22] Filed: May 14, 1979

[30] Foreign Application Priority Data

May 25, 1978 [NL] Netherlands .................... 7805669

[51] Int. Cl.³ .................... C25F 5/00; C01G 41/00
[52] U.S. Cl. .................... 204/146; 423/55
[58] Field of Search ............ 204/130, 140, 146; 423/53, 54, 55

[56] References Cited

U.S. PATENT DOCUMENTS

| | | | |
|---|---|---|---|
| 1,261,383 | 4/1918 | Hamilton | 423/55 |
| 2,704,240 | 3/1955 | Avery | 423/55 |
| 3,151,049 | 9/1964 | Hendry | 204/146 |
| 3,438,730 | 4/1969 | Shwayder | 423/53 |
| 3,649,487 | 3/1972 | Aue | 204/146 |
| 3,887,680 | 6/1975 | MacInnis | 423/53 |
| 4,128,463 | 12/1978 | Formanik | 204/146 |
| 4,140,597 | 2/1979 | Kobayakawa | 204/140 |

Primary Examiner—T. Tufariello
Attorney, Agent, or Firm—Daniel M. Rosen

[57] ABSTRACT

The process is principally based upon an electrochemical technique due to which the binding material for tungsten and cobalt is dissolved and from the solution under certain conditions cobalt or its composition is regained. From the undissolved material after electrolysis tungsten is disposed. By this improved method a very fast decomposition of the hard metal is obtained. Tungsten carbide scrap—a waste material from hard metal tools—can be a decomposed preferably by electrolysis as shown in FIGURE attached.

12 Claims, 1 Drawing Figure

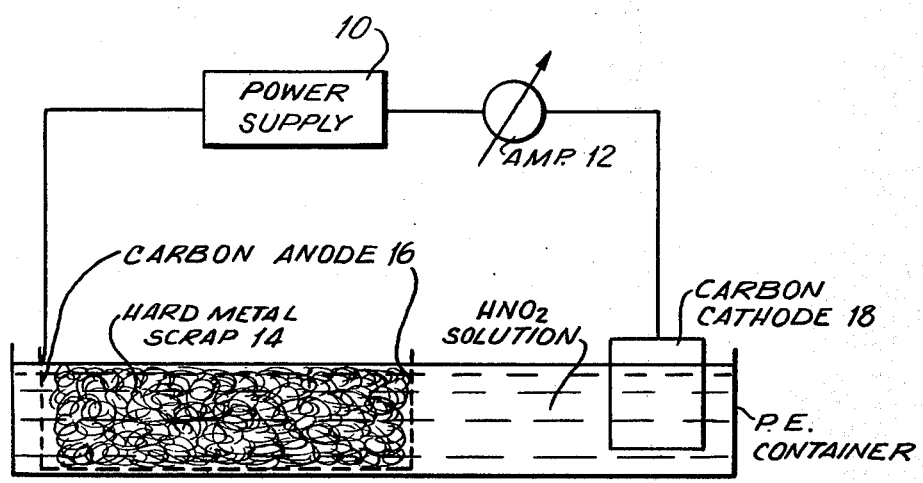

PROCESS FOR DECOMPOSING HARD METAL SCRAP

BACKGROUND OF THE INVENTION

This invention relates to a process for decomposing hard metal scrap.

DESCRIPTION OF THE PRIOR ART

Hard metal is a mixture consisting of grains of hard tungsten carbides, such as $W_2C$ and $WC$, which are bound together with a binding metal consisting of cobalt, nickel and/or iron, but preferably of cobalt alone. Hard metal of this type is used on a large scale in the metal industry, among other things in the form of cutting plates for cutting tools. When these cutting plates are no longer sufficiently sharp, or have been damaged, they are collected as scrap with a view to recovering the tungsten and cobalt. To this end the scrap is first comminuted in a mechanical manner; however, the metallic cobalt cannot be dissolved out of these residues by a simple process because cobalt, in this state, is scarcely attacked by dilute hydrochloric acid or sulfuric acid at room temperature, nor is it attacked to any greater extent by nitric acid which, though dissolving a part of the metal, subsequently passivates the remaining surface. At elevated temperatures cobalt does dissolve in these acids, but attempts to remove cobalt from hard metal in this manner have been unsuccessful because the dissolution proceeds at a very slow rate, inasmuch as the tungsten carbide grains prevent fresh acid from reaching the surface of the cobalt in a uniform manner.

SUMMARY OF THE INVENTION

The present invention provides a method for dissolving the cobalt from hard metal at a satisfactory rate, and for obtaining cobalt or its compounds from the solution, and at the same time permits the recovery of tungsten compounds from the undissolved part of the hard metal. The foregoing method dissolves the binding metal out of the scrap through electrolysis of a dilute nitric acid solution, with the scrap serving as an anode and an inert cathode, the tungsten compounds being obtained from the undissolved part of the scrap after the electrolysis.

BRIEF DESCRIPTION OF THE DRAWING

The sole FIGURE shows the electrolysis bath employed in conjunction with the present invention.

DESCRIPTION OF THE PREFERRED EMBODIMENT OF THE INVENTION

In accordance with the invention the binding metal is dissolved out of the scrap through electrolysis of a dilute nitric acid solution between the scrap, serving as anode, and an inert cathode, while after the electrolysis, tungsten compounds are obtained from the undissolved part of the scrap. Since in actual practice the scrap consists of a large amount of small hard metal pieces, it is virtually impossible to connect each of these pieces separately with a lead-in wire. However, with reference to the FIGURE the current supply from a source 10, measured through a meter 12 can be realized in a very simple manner by placing the scrap 14 in a perforated holder 16 made of an electrically conductive inert material, which serves as a collector, and then immersing this assembly in the electrolyte and using it as the anode. Referring to the FIGURE, it is preferred to employ a holder 16 which may be made of or lined with carbon. When using the process according to the present invention the anodic current density ranges between 2 and 10 amp per kg of scrap. However, the best result is achieved at a current density of 4 to 6 amp per kg of scrap. A cathode 12 made of a carbon, such as graphite, is highly suitable for use as an inert cathode. The electrolyte may expediently contain 5 to 15 percent by weight, and preferably 7 to 12 percent by weight, of $HNO_3$, and during the electrolysis the $HNO_3$ content is maintained through continuous or periodical addition of $HNO_3$. The electrolysis may be carried out without external heating, but as a result of the electrical energy supplied the temperature rises slightly above ambient temperature. It is found that in this manner the binding metal, cobalt in particular, goes rapidly into solution, so that within a few hours the binding metal is completely dissolved and the hard metal object is decomposed in its entirety.

During tests it has been found that the process according to the present invention can be carried out when the electrolyte used is dilute nitric acid, but that the use of hydrochloric acid or sulfuric acid as an electrolyte results in a much slower rate of dissolution of the binding metal, so that these acids are practically useless.

During the electrolysis of a part of the scrap or of a number of successive parts of the scrap, continuously increasing amounts of cobalt are dissolved in the electrolyte until the limit of dissolution of the nitrates is approached. At that time it is necessary to replace the electrolyte and work it up; but apart from that it is not necessary to stop the recovery process completely. When the binding metal consists exclusively of cobalt, the electrolyte may be allowed to cool in order to let a certain amount of cobalt nitrate crystallize out, which is then separated, so that the electrolyte may be reused, possibly after replenishing the nitric acid content. However, if the binding metal contains other metals in addition to cobalt, such as nickel and/or iron, then it is usually necessary to make use of more complicated separation methods, and in that case it is often expedient to first remove the cobalt and/or nickel from the electrolyte by an electrolytic process. In both cases, however, valuable amounts of cobalt or cobalt salts, and possibly nickel or nickel salts, are obtained. Usually the undissolved part of the scrap which consists substantially of tungsten carbides, cannot be processed again into hard metal without further measures; it must first be established that they are sufficiently free of impurities.

According to a preferred method of practicing the present invention the undissolved part is worked up into tungsten oxides by first heating the undissolved part, which consists mainly of tungsten carbides, in air above 700° C. until the whole material has been oxidized. Heating of the hard metal itself under these conditions results only in a very slow oxidation. The oxidized material is then dissolved in a sodium hydroxide solution by a method otherwise known in the art, e.g. in a sodium hydroxide solution having a concentration of 33%, in which the $WO_3$ is completely dissolved with the formation of $NaWO_4$. Any components which do not dissolve in the sodium hydroxide solution can then be separated, whereupon the clarified solution is acidified, preferably with hydrochloric acid. Upon acidification, tungsten trioxide hydrate precipitates as a yellow product, and this precipitate is separated by sedimentation or filtration; it is washed, preferably with dilute nitric acid and then with water, and is then dried at an elevated temperature in order to completely remove not only the adherent water but also the water of hydration. After this drying operation pure $WO_3$ is obtained, which is free of traces of binding metal. This $WO_3$ can then be reused for the preparation of pure tungsten carbides.

The invention will be illustrated by the following examples.

EXAMPLE 1

A block of hard metal weighting 125 g (82 percent by weight of WC and 18 percent by weight of Co) was suspended in an electrolyte consisting of 10% $HNO_3$, and a graphite plate was used as the cathode. The distance between the hard metal and the cathode was 5 cm. A current of 2 amperes at a terminal voltage of 12 V was passed through the cell formed in this manner. After 6 hours it was found that 20 percent of the hard metal block had decomposed.

In another test a cylindrical block of the same hard metal, weighing 150 g (dimensions: about 4 cm×2.5 cm) was electrolyzed in the same manner but at 4 amperes and 12 volts. In this case about 50 percent of the block was completely decomposed after 6 hours.

For comparison a similar test was carried out in 10% HCl. In this case a block of the same hard metal, weighing 130 g, was electrolyzed at a current strength of 4 amp and a voltage of 12 V. After 6 hours only 7 percent of the hard metal had decomposed.

EXAMPLE 2

In this test the electrolytic cell consisted of a rectangular tank of 15 cm×50 cm×80 cm. 50 liters of 10% nitric acid solution were placed in this tank and a plate-like graphite electrode was placed at one end. The anodic lead was connected to a perforated holder made of carbon, in which 6 kg of hard metal scrap, known to contain only Co as binding metal, was placed. Thereupon this holder was placed in the electrolyte close to the cathode but without touching the cathode. A current of 15 amperes was then passed through the cell at a terminal voltage of 12 V. After 20 hours of electrolysis it was found that practically the entire amount of hard metal had decomposed. The small residual amounts of hard metal could be separated from the tungsten carbide particles by placing the whole mass on a sieve and washing away the fine particles with water. The remaining coarse particles were used in a subsequent electrolysis. The fine particles, which were freed from the remaining coarser hard metal particles, were dried and heated in an oven at about 800° C. for about 2 hours with free access to air. At the end of this period virtually the entire amount of material had been converted into a brownish-yellow powder, which was removed from the oven and cooled.

The powder was dissolved in hot 33% NaOH solution, whereby a small amount of dark-colored material remained undissolved: this material was filtered off and used in a subsequent electrolysis.

The resulting hot solution of $NaWO_4$ was slowly poured into a hot 33% hydrochloric acid solution, whereupon a yellow precipitate of $WO_3.H_2O$ was formed. The precipitate was filtered off and washed with dilute nitric acid in order to dissolve any cobalt compounds, and then dried at 450° C. As a result of this treatment all water of hydration was driven off and 5.9 kg of pure $WO_3$ were obtained.

The solution obtained in the electrolysis was evaporated to dryness, and 1.8 kg of $Co(NO_3)_2$ were obtained.

What is claimed is:

1. A process for the decomposition of hard metal scrap containing tungsten carbides and binding metal which includes cobalt, comprising the steps of electrolyzing a dilute nitric acid solution initially containing 5 to 15 percent of $HNO_3$ by weight with the scrap serving as the anode, and using an inert cathode, using an anodic current density of 2 to 10 amperes per Kg of scrap, removing tungsten compounds from the undissolved part of the scrap after the electrolysis and separating said cobalt from the resulting solution.

2. The process of claim 1, wherein said scrap is placed in a perforated holder of electrically conductive inert material and serving as a collector, said assembly being used as the anode.

3. The process of claim 2, wherein said holder consists of or is lined with carbon.

4. The process of claim 1, wherein a current density of 4 to 6 amperes per kg of scrap is used.

5. The process of claim 1, wherein an electrolyte initially containing 7 to 12 percent of $HNO_3$ by weight is used, and that during the electrolysis the $HNO_3$ content is maintained through continuous or periodical addition of $HNO_3$.

6. The process of claim 1, wherein the binding metal consists entirely of cobalt, said cobalt nitrate being crystallized from the resulting solution.

7. The process of claim 1, wherein the undissolved part of the hard metal which has been freed from binding metal is separated and dried and the tungsten compounds present are converted into $WO_3$ by heating in air to above approximately 700° C.

8. The process of claim 7, wherein the resulting $WO_3$ is dissolved in a NaOH solution to form $NaWO_4$; the further steps of clarifying said solution, acidifying said solution; thereby causing tungsten oxide hydrate to precipitate, and then isolating said precipitate, and washing and drying said precipitate thereby resulting in the formation of pure $WO_3$.

9. A process for the decomposition of hard metal scrap containing tungsten carbide and binding material comprising cobalt and for recovering said cobalt and tungsten or compounds thereof, comprising the steps: disposing said scrap in a dilute nitric acid solution, electrolyzing said solution with said scrap serving as the anode and using an inert cathode, thereby dissolving said cobalt into said solution and forming cobalt nitrates, subsequently cooling said electrolyte solution causing said cobalt nitrates to crystallize out to be recovered with undissolved scrap containing tungsten carbide remaining, oxidizing said undissolved scrap by heating same in an oxygen-containing gas at a temperature above 700° C., dissolving said oxidized scrap in a sodium hydroxide solution whereby $WO_3$ is dissolved into solution forming $NaWO_4$, and acidifying said solution including $NaWO_4$ whereby tungsten trioxide hydrate ($WO_3.H_2O$) precipitates out and is separated as $WO_3$.

10. A process according to claim 9 wherein said step of acidifying said solution comprises using hydrochloric acid.

11. A process for the decomposition of hard metal scrap containing tungsten carbide and binding material comprising cobalt and for recovering said cobalt thereof, comprising the steps: disposing said scrap in a dilute nitric acid solution, electrolyzing said solution with said scrap serving as the anode and using an inert cathode, thereby dissolving said cobalt into said solution forming cobalt nitrates, and subsequently cooling said electrolyte solution causing said cobalt nitrates to crystallize out to be recovered.

12. A process according to claim 9 or 11 wherein said anodic current density is 2–10 amp per kg of scrap, and said electrolyte contains initially 5–15% by weight $HNO_3$.

* * * * *